Feb. 16, 1971  O. H. SCHMITT  3,562,928
TRAINING SYSTEM
Filed Aug. 7, 1944  3 Sheets-Sheet 3

INVENTOR.
OTTO H. SCHMITT
BY
ATTORNEYS

_United States Patent Office_  3,562,928
Patented Feb. 16, 1971

3,562,928
TRAINING SYSTEM
Otto H. Schmitt, Port Washington, N.Y., assignor to the United States of America as represented by the Secretary of the Navy
Filed Aug. 7, 1944, Ser. No. 548,487
Int. Cl. G09b 9/00
U.S. Cl. 35—25                                                                                    7 Claims This invention relates to training systems, and more particularly to systems for the training of personnel in the use of detection equipment adapted to be carried in an attacking or searching craft for locating a target by detection of a chosen characteristic thereof.

Numerous devices have been developed by means of which a target craft may be detected by an attacking craft and its location determined with more or less accuracy. Due to the large number of variables involved in detection of a moving target craft from a moving attacking craft, the operating techniques employed in the use of these devices are necessarily relatively complicated. The operating personnel of attacking craft equipped with such detection devices must, therefore, receive intensive training and considerable practice in the use of the particular detection device employed before the full advantages to be enjoyed in the use of such equipment can be realized.

For example, one type of detection equipment for the general purposes outlined above is disclosed generally in Letters Pat. No. 2,689,333 issued Sept. 14, 1954 for a Magnetic Stabilization System to Donald G. C. Hare. This equipment comprises a magnetically stabilized magnetometer arranged to be mounted in an aircraft and used for the location of invisible magnetic targets, as for example submarines. Means are provided for maintaining a plane substantially perpendicular to a relatively uniform magnetic field, and these means comprise first and second magnetometer elements disposed with their axes mutually forming an angle other than zero and at least one at an angle other than 90° to the plane, together with means responsive to the output of the first magnetometer element due to the magnetic field for rotating the plane about a first axis not parallel to the axis of the first magnetometer element, and means responsive to the output of the second magnetometer element due to the magnetic field for rotating the plane about a second axis not parallel to the axis of the second magnetometer element and not parallel to the first axis.

A pair of magnetometer elements are mounted at either end of a shaft with their axes mutually at right angles to an imaginary plane. The shaft is mounted pivotally in a gimbal frame and carries a first pulley. The gimbal frame in turn is mounted pivotally on a base in such a manner as to be free to rotate about an axis perpendicular to the axis of the shaft. The gimbal frame carries a second pulley.

A belt engages the first pulley and a third pulley which is driven by a first motor. The second pulley is driven from a fourth pulley by means of another belt, the fourth pulley being in turn driven by a second motor. The first motor is energized from a first control unit which in turn is controlled by the second magnetometer element. Similarly, the second motor is energized from a second control unit which is controlled by the first magnetometer element.

A detector magnetometer is mounted on the first pulley in such a position that its axis is perpendicular respectively to the axes of the first and second magnetometer elements, and hence perpendicular to the imaginary plane above mentioned. Then the detector magnetometer element can be maintained parallel with the earth's magnetic field. Since the output of this magnetometer element varies as the cosine of the angle by which it deviates from alignment with the magnetic field, its output will vary only slightly for small angles of deviation, and hence its position in space is relatively non-critical. When the detector magnetometer element is parallel with the earth's magnetic field, the first and second magnetometer elements will be disposed with their axes respectively perpendicular to the field. Since the output of a magnetometer element thus disposed is a function of the sine of the angle by which it deviates from true perpendicularity with the field, small deviations in the position of the element will produce relatively large changes in output, and the sense of these output changes will depend on the direction in which the element deviates. Thus, any deviation from perpendicularity of either of the first and second magnetometer elements immediately causes a movement of the proper direction and extent to restore the magnetometer element to the desired perpendicular position. This in turn insures that the detector magnetometer element will be maintained parallel with the earth's magnetic field in spite of wide variations in the position of the base. Using this device, the magnetic field of the target craft is effectively measured by measuring, through the detector magnetometer element, the change in the earth's steady magnetic field caused by the presence of the target craft.

The use of the detection system above referred to is complicated by the fact that the magnetization of a target craft varies as a function of its past magnetic history, its geographical location and its compass heading. Furthermore, the indications produced by the detection equipment vary not only with the magnetic characteristics of the target craft, but also with the relative compass courses of the attacking and the target craft, and with the vertical separation between the two.

It will be apparent, therefore, that maximum utilization of a particular type of detection equipment depends upon skilled operation and upon the use of tactical procedures designed specifically for use with the equipment to obtain the maximum possible information from the indications produced thereby.

Considering again for example the magnetic detection equipment refered to above, it is obvious that adequate training of operating personnel in the use of such equipment can be carried out using actual aircraft and submarines only with attendant risks both to the participating craft and to the crews thereof. In addition, such training methods require that valuable equipment be taken out of active service, a generally costly and inefficient procedure. Furthermore, since the magnetization of the target craft varies with its size, its past magnetic history and its geographical location, training using actual materiel is effectively limited to a special set of conditions, whereas in the actual tactical use of the equipment many other sets of conditions may be encountered, depending for example upon the geographical location of the operational area.

Accordingly, it is an object of the invention to provide a training system whereby operating personnel may be indoctrinated in the use of detection equipment of the general type herein contemplated without the use of actual materiel.

Other objects of the invention include the provision of a training system capable of reproducing the numerous tactical situations encountered in the actual use of such detection equipment without requiring costly training operations, and the provision of training means capable of use also in the selection of operating personnel and in the development of new and improved detection equipment.

In view of the above, the invention provides in one aspect in a system for training personnel in the use of detection equipment adapted to be mounted in an attacking craft and used for the location of a target craft by detection and measurement of a chosen characteristic of the latter, an area reproducing at reduced scale a tactical area, remotely controlled attacking and target craft models independently movable in respect to the area, means associated with the target craft model simulating the chosen characteristic of the target craft, means associated with the attacking craft model simulating the detection equipment, and means capable of producing indications of the location of the target craft model similar to the indications of the location of an actual target craft produced by the actual detection equipment.

In other aspects the invention provides, in addition to the above, means for simulating a bombing attack by the attacking craft on the target craft, with means indicating the results of such an attack; means at the remote-control positions for the attacking and target craft for indicating respectively the location of the associated craft in respect to the tactical area; and means for producing a permanent record of the tracks of the two craft during a training period.

Details of the training system of the invention depend largely upon the type of detection equipment in connection with which training is to be given. When such a system is used in connection with training in the use of airborne magnetic detection equipment of the type referred to above, the attacking craft is represented by a model aircraft, while the target craft is a model submarine. The model submarine is equipped with means for producing a magnetic field scaled to that of an actual submarine and variable in the same sense that the field of the actual craft varies, while the model aircraft is equipped wtih a simulated magnetometer system for measuring the magnetic field of the model submarine.

It will be understood that the training system of the invention may be adapted for use in connection with detection devices other than the magnetic detection device referred to above. In such cases, the nature of the attacking and target craft, as well as the type and principle of operation of the simulated detection equipment, determine the specific embodiment of the invention.

The above and other features of the invention will be described in the following specification and pointed out in the appended claims.

Figure 1:
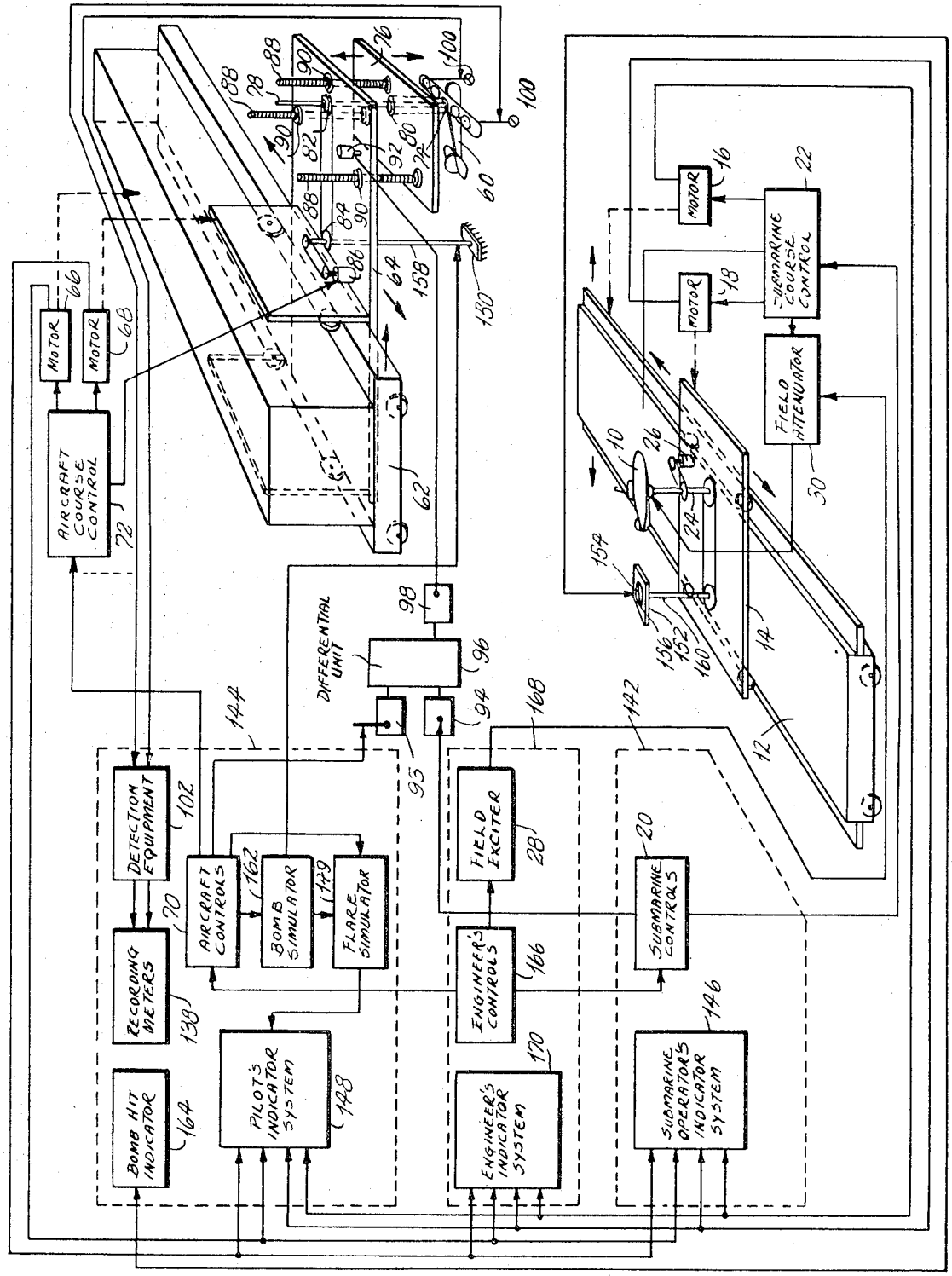
FIG. 1 is a schematic view, partially in block form, of a training system according to the invention, adapted for use in training in connection with magnetic detection equipment.

The training system of the invention, as shown in FIG. 1, is essentially a device by means of which tactical situations involving an attacking aircraft and target submarine may be reproduced at a reduced scale. Models of the two craft are mounted on suitable suspension systems for movement in respect to an area representing an ocean area in response to adjustments of separate sets of remote controls. The models are arranged to move at scaled speeds and on any desired course, and means are also provided for varying the vertical separation between the models, such variations corresponding to changes in altitude of the aircraft and changes in depth of the submarine. Conveniently all separation adjustments are effected by moving one of the two models in a vertical direction, the other remaining at all times in a single maneuvering plane. Since the aircraft may climb and dive, and the submarine may surface and submerge, it will be understood that this arrangement requires a fictitious ocean surface which lies in a plane between the planes of motion of the model craft, its vertical position depending upon the relation which the aircraft altitude bears to the submarine depth.

As stated above, the entire training system is a scale model reproduction in which attacking and target craft are reproduced to scale and in which the model submarine is provided with means for producing a magnetic field scaled to the magnetic field in an actual submarine. It is well known that the magnetic phenomena associated with an actual magnetic object may be reproduced with exact similitude if the physical dimensions of the object and the distribution of its magnetism are preserved at the reduced scale. It is also well known that the scaling of the magnetic phenomena need not necessarily be the same as that of the physical dimensions so long as proper recognition is given to the difference of scale factors when observations are made.

Conveniently, the magnetic field of an actual submarine may be considered to be due to a total magnetic moment associated with the submarine. This moment may conveniently be considered the resultant of three component moments chosen respectively to lie along the fore-and-aft or longitudinal axis of the submarine, along the athwart-ship or transverse axis of the submarine, and along a vertical axis normal to each of the other chosen axes. These component moments may conveniently be referred to as the longitudinal, transverse and vertical moments, respectively.

In the model submarine, coils are provided for generating each of the three component moments, the distribution of coil turns being such in each case that the distribution of magnetism of a particular actual submarine is reproduced. These coils may be excited with direct current if desired, or preferably and in order to enjoy certain advantages, they may be excited with alternating current in accordance with the disclosure of Letters Pat. No. 2,626,308 issued Jan. 20, 1953 for a Method of Magnetic Investigation to Otto H. Schmitt. As taught in that patent, the magnetic field of a body may be studied by substituting for the body a coil array capable of producing a current distribution related to the magnetization of the body and exciting the array with alteranting current of arbitrary amplitude, choosing a point in relation to the coil array corresponding to a point in relation to the body at which the magnetic field of the latter is known, measuring the field of the coil array at the chosen point, determining a calibration factor for the measuring device from the data thus obtained, and thereafter using the calibrated measuring device to determine the field of the coil array at the other points.

Assuming that the magnetization of the body to be investigated is known or can be determined, a coil array is arranged to replace the magnetic body to produce the magnetic field to be investigated. Since the magnetic field produced by a body having any given magnetization can also be produced by means of a current distribution determinable from the given magnetization, the desired current distribution can be obtained through the use of a coil array the turns of which are distributed to produce the required current distribution.

When the proper coil configuration is excited with direct current, a steady magnetic field scaled to that of the body to be investigated is produced. If alternating current excitation is used, the field produced will be identical in direction to that of the body at every point but will have a sinusoidally varying magnitude. Thus, alternating current from a suitable source is used to excite the coil array, a convenient current amplitude being chosen arbitrarily. When a detection device such as a simple pickup coil is placed in the alternating magnetic field, an alternating E.M.F. is generated therein, the peak amplitude of which can be measured facilely by a vacuum tube voltmeter.

The current distribution can be produced by three mutually perpendicular coils (vertical, horizontal and transverse oriented coils) each having suitably distributed turns. Excitation for the three component coils is provided by a single oscillator, the output of which is applied to the input terminals of each of three similar amplifiers, each having potentiometer means to vary the signal supplied. The amplifiers can be standard audio-frequency amplifiers having constant phase shift and means for phase adjustment, one amplifier being associated with each of the coils. Double-pope double-throw switches in the circuits between amplifiers and coils permit reversal of the phase of the excitation current to any of the component coils. Thus, the output terminals of each amplifier are connected to the blade terminals of the associated switch, the fixed terminals of which are arranged as in the usual reversing switch. The component coils are connected to one set of the fixed terminals in each case.

A known fixed resistor is included in each circuit connecting an amplifier to blade terminals. A double-pole three-position switch permits connection of a vacuum tube voltmeter across any one of the fixed resistors, thereby permitting measurement of the excitation current supplied to each of the component coils. The use of alternating-current excitation makes possible the use of simple pickup coils instead of magnetometers as measuring devices, and also makes possible the reproduction of the magnetic field situation obtaining at any geographical location, irrespective of the actual direction and magnitude of the earth's magnetic field existing at the location of the training system. Accordingly, alternating-current excitation is used and the simulated detection devices, mounted on the model aircraft, are simple pickup coils.

Considering the elements of the training system of FIG. 1 in greater detail, the submarine equipment includes a scale model 10 of an actual submarine, mounted on a translation system capable of giving it plane motion along any desired path, and means are provided for orienting the model in the direction of its travel. Conveniently, the translation system comprises a beam 12 movable back and forth in one direction in respect to the tactical area, and a carriage 14 movable along the beam and supporting model submarine 10. Motor 16 is provided for moving the beam, while motor 18 is arranged to move the carriage along the beam, as indicated diagrammatically in FIG. 1 by means of dashed lines.

Preferably, drive motors 16 and 18 are mounted in fixed position at some distance from the driven members so that magnetic disturbances associated therewith will not interfere with the magnetic field of the the model submarine. Conveniently, the mechanical connections between drive motors 16 and 18 and their respective driven members may be in accordance with the disclosure of copending application Ser. No. 547,478, series of 1935 filed July 31, 1944, Translation System, Otto H. Schmitt and Earl G. Sorensen. This system is such that desired movements of the beam and carriage may be effected by means of remotely located drive motors connected to the moving members by cable systems which prevent the beam from yawning and which allow independent motion of either the beam or the carriage.

Motors 16 and 18 are controlled by a remotely located submarine operator for whom simulated submarine controls 20 are provided. These controls actuate course-control mechanism 22, by means of which the heading and speed data furnished by controls 20 are translated into control voltages for motors 16 and 18, such that required motions of beam 12 and carriage 14 are effected to move the model submarine along a desired course. Conveniently, submarine course-control mechanism 22 may be of the type disclosed in Letters Pat. No. 2,667,610 issued Jan. 26, 1954 for Plural Control System for use with Translation Devices to Otto H. Schmitt and William B. Greenlee, which provides means for controlling motions of a beam suspension system of the type used herein in response to unitary heading control means to cause motion of a body mounted on the carriage along any desired path.

So that the model submarine may always be oriented in the direction of its travel, it is supported on carriage 14 for rotation about a vertical axis by turntable 24, driven by heading motor 26. As disclosed in the patent last referred to, heading motor 26 may be a self-synchronous receiver arranged for rotation in response to rotations of a heading self-synchronous generator actuated by the submarine course-control mechanism.

Submarine model 10 contains an array of three coils arranged respectively to generate magnetic fields proportional to the longitudinal, transverse and vertical magnetic moments of the actual submarine to be reproduced, excitation for the three coils being provided by means of field exciter 28. Considering now the nature of the magnetic field of a submarine, it will be seen that its field may be considered to be due in part to permanent magnetism or "perm" which depends upon the past magnetic history of the submarine, and in part to induced magnetism which depends upon the geographical location of the submarine at the time of consideration and upon its heading.

Variations in perm, in general, occur quite slowly and depend upon such matters as whether or not the submarine has been flashed or depermed or has been subjected to violent shocks, as for example those produced by depth charges. Induced magnetism on the other hand has been shown to vary with both geographical location and heading during the tactical period under consideration. Variations in geographical location result in variations of the dip angle in the earth's magnetic field, while variations in heading cause variations in the relative orientation of the submarine and the earth's magnetic field. The longitudinal and transverse components of induced magnetism vary with both dip angle and heading, while the vertical component varies only with the dip angle.

In the model system of the invention, it is necessary only to reproduce the variations in magnetism of the submarine which occur during a particular tactical period. Thus variations in perm may be neglected and only variations in induced magnetism reproduced. The vertical induced moment may be considered constant for a tactical period, since the dip angle will not change appreciably over the tactical area. Therefore, it is necessary only to vary the longitudinal and transverse components of induced magnetism with the heading of the model submarine, the three perm components remaining substantially constant.

As pointed out above, the use of alternating-current excitation for the three coils of the model submarine makes possible the reproduction of the situation obtaining at various geographical locations. In other words, the induced magnetism due to the earth's magnetic field at varying dip angles may be reproduced by varying the excitation applied to the appropriate component coils.

Accordingly, provision is made for adjusting the excitation supplied by field exciter 28 to each of the coils, thereby to permit simulation of submarines of different magnetic characteristics. In addition, field attenuator unit 30 is provided to cause proper variations in the excitation to simulate variations of the induced magnetism with heading of the submarnie.

A consideration of the geometry of the system including a submarine and the earth's magnetic field will indicate that the longitudinal induced moment varies as the cosine of the heading angle measured from magnetic north, while the transverse induced moment varies as the sine of the same angle. Referring now to the disclosure of Letters Pat. No. 2,667,610 above identified, it will be seen that in its operation submarine course-control device 22 generates quantities proportional respectively to the sine and cosine of the heading angle. These quantities are used to control field attenuator unit 30.

Figure 2:
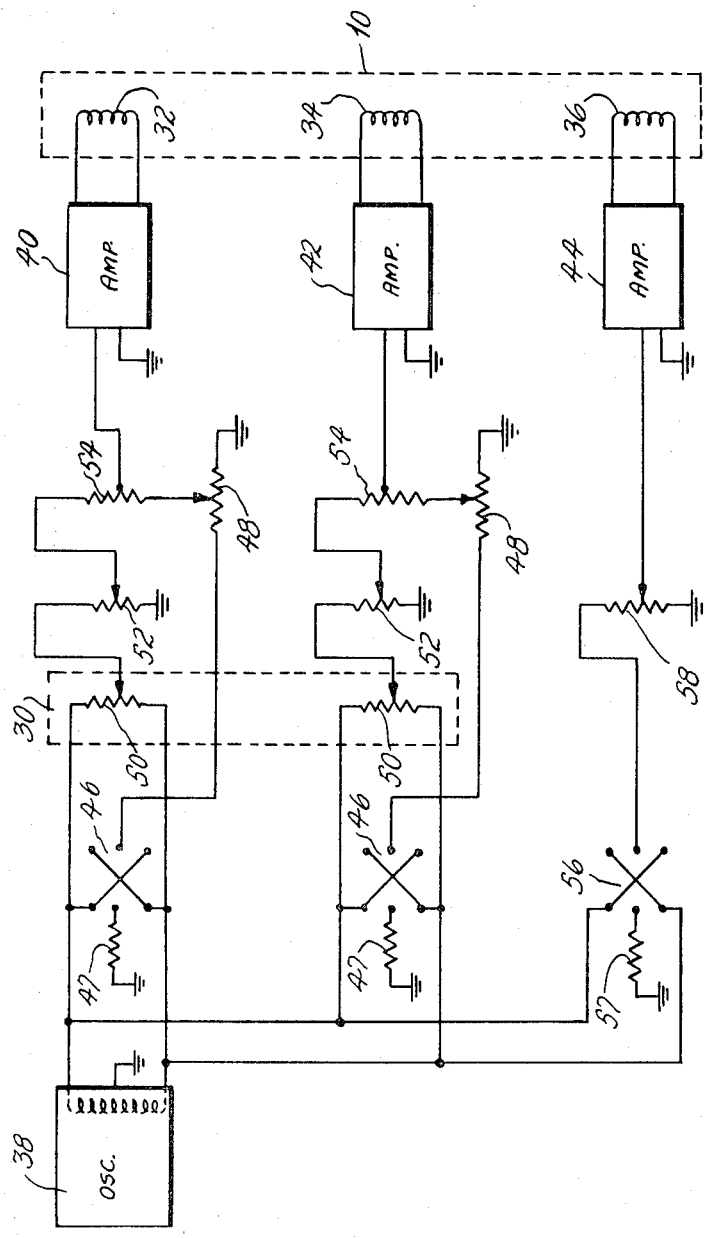
FIG. 2 is a circuit diagram of means for generating the magnetic field for the model submarine.

The equipment indicated at 28 in FIG. 1 for supplying excitation to the coils is shown in detail in FIG. 2. Referring to FIG. 2, three field generating coils 32, 34 and 36 are provided. These are mounted in model submarine 10 and serve respectively to generate the longitudinal, transverse and vertical components of its total magnetic moment. Excitation for these coils is derived from oscillator 38, the output of which after attenuation by suitable control devices is applied to amplifiers 40, 42 and 44 which are connected respectively to component coils 32, 34 and 36.

The control systems for the excitation to amplifiers 40 and 42 are substantially identical and in each case provide means for applying to the associated amplifiers excitation proportional to a desired perm component and excitation proportional to a desired induced component, the output of the two amplifiers then being proportional respectively to the longitudinal and transverse moments of the submarine moments of the submarine to be simulated. In each case, the excitation proportional to the induced component is subjected to variation by attenuator unit 30 in accordance with the heading of the model submarine.

In each of the control circuits for amplifiers 40 and 42, the center-tapped output of oscillator 38 is applied through a phase-reversing switch 46 to resistor 47 and to the winding of a potentiometer 48. The output of the same oscillator is also applied across the winding of a potentiometer 50, this potentiometer being included in field attenuator unit 30. The sliding contactor of potentiometer 50 is connected through the winding of potentiometer 52 to ground. The sliding contactor of potentiometer 52 is connected through tapped resistor 54 to the sliding contactor of potentiometer 48, and the tap of resistor 54 is connected to one of the input terminals of the associated amplifier, the other input terminal of which is grounded.

Thus, there is provided means for applying to the inputs of amplifiers 40 and 42, respectively, excitation components the phase of which may be reversed by switches 46 and the magnitude of which may be adjusted by means of potentiometers 48, these excitation components being proportional to the desired longitudinal and transverse perm components, respectively. In addition, excitation components may be applied to amplifiers 40 and 42, having peak magnitudes adjustable by means of potentiometers 52 and instantaneous magnitudes adjustable by means of field attenuator potentiometers 50, these components being proportional to the desired longitudinal and transverse induced components to be reproduced.

Coil 36, which generates the vertical moment, requires excitation proportional only to the vertical perm component. Thus the output of oscillator 38 is applied through phase-reversing switch 56 to a resistor 57 and to the winding of potentiometer 58, the sliding contactor of which is connected to one input terminal of amplifier 44, the other input terminal of which is grounded.

Thus in setting up the training system for operation, the three component moments due to perm may be adjusted using potentiometers 50 and 58, while the peak values of the two induced components may be adjusted by means of potentiometers 52. Polarity of the perm components may be chosen by using phase-reversing switches 46 and phase-reversing switch 56, this procedure being in accordance with the teachings of Letters Patent No. 2,626,308 above identified. The instantaneous magnitudes of the induced components are varied in accordance with the heading of the model submarine by means of field attenuator potentiometers 50.

The equipment reproducing the attacking aircraft includes a scale model 60 (FIG. 1) of a typical aircraft, which is supported for movement in planes parallel to the plane of motion of submarine model 10 over the tactical area. Conveniently, model aircraft 60 is mounted on a beam translation system similar to that used in the case of the model submarine and comprising beam 62 movable over the tactical area, and a carriage 64 movable along the beam, this translation system being in superposition with that for model submarine 10.

The model aircraft translation system is driven by motors 66 and 68, acting through cable systems similar to those used in the case of the submarine model. Control of motors 66 and 68 is in response to heading and throttle controls included with aircraft controls 70 and actuating aircraft course-control mechanism 72, which is substantially identical with the course-control mechanism used in the case of the submarine model.

As in the case of the model submarine, means are provided for orienting the model aircraft substantially along its direction of motion. For this purpose, model aircraft 60 is rotatably supported by fixed gear 74 mounted on substage 76, which is in turn suspended from carriage 64. Shaft 78 journaled in bearing 80 on substage 76 and rotatable in respect to fixed gear 74 is attached at its lower end to model aircraft 60. The upper end of shaft 78 is splined and slidably engages sprocket 82. Sprocket 82 is driven through a chain from sprocket 84, which is in turn driven by heading motor 86. Heading motor 86 is conveniently a self-synchronous receiver, the rotation of which is controlled by means of a self-synchronous generator included in aircraft course-control unit 72 as disclosed in Letters Pat. No. 2,667,610, referred to above. As is also disclosed in that patent, aircraft course-control mechanism 72 includes means whereby the crabwise flight of an aircraft may be reproduced in the model, the component velocities of beam 62 and carriage 64 being suitably altered for this purpose without effecting the operation of the heading mechanism just described.

As has previously been stated, adjustments of the vertical separation of the two models to simulate climbing and diving of the aircraft and submerging and surfacing of the submarine are conveniently effected by moving only the model aircraft vertically. For this purpose, substage 76 is vertically adjustable in respect to carriage 64. The elevator mechanism for this purpose comprises three screw-type elevators 88, each actuated by means of drive nuts 90, which are connected together by means of a sprocket chain and driven by elevator motor 92.

Since the elevator mechanism just described must be actuated whenever either airplane or submarine moves vertically in respect to the fictitious ocean surface, its control is effected both by submarine controls 20 and aircraft controls 70. The action of the elevator controls included in aircraft controls 70 and submarine controls 20 is in each case limited so that these controls are effective only to cause changes in the separation of the two models within the maneuvering range of the respective models. For this purpose, the aircraft altitude control causes rotation of aircraft altitude motor 93, while submarine depth control causes rotations of submarine depth motor 94. The shafts of motors 93 and 94 are connected to the input shafts of a differential drive unit 96, the output shaft of which turns through the algebraic sum of the rotations of motors 93 and 94. The output shaft of differential drive unit rotates a self-synchronous transmitter 98, which controls self-synchronous elevator motor 92.

Limit switches are associated with each of motors 93 and 94 allowing their rotation in each case through an appropriate number of revolutions corresponding to the vertical maneuvering range of the craft with which they are associated. Thus operation of submarine depth motor 94, without operation of aircraft altitude motor 93, can reduce the separation of the two models only until the condition simulating the surfaced submarine is reached. Similarly, operation of aircraft altitude motor 93, without operation of submarine depth motor 94, can reduce the separation between the models only until the condition obtaining when the aircraft crashes into the ocean is reached.

The model aircraft is provided with simulated detection equipment by means of which the operation of actual magnetic detection equipment of the type disclosed in Letters Pat. No. 2,689,333 referred to above, may be reproduced. Conveniently, means are provided for simulating a dual installation in which two complete detection systems are employed.

Since the field generating coils of submarine model 10 are provided with alternating-current excitation in accordance with Letters Pat. No. 2,626,308 already mentioned, the magnetometer system of the actual detection apparatus may be considerably simplified in the model. Accordingly, the magnetically stabilized magnetometers are simulated by means of simple pickup coils 100. Since model aircraft 60 turns accordingly to the heading on which it is flying, means are provided for orienting pickup coils 100 of the dual detection system in space. Thus, as in the actual detection equipment, means are provided for orienting the pickup coils about vertical axes to maintain the horizontal projections of their longitudinal axes parellel to the direction chosen as magnetic north irrespective of the heading of the model aircraft.

In view of the fact that no provision is made for changing the altitude of the model aircraft as it climbs or dives, further orientation of pickup coils 100 is not required. They are, however, rotatably mounted on horizontal axes normal to their orientation axes, this provision being required in accordance with the teachings of Letters Pat. No. 2,626,308 just mentioned, so that operation at locations of different dip angles may be simulated. Thus, the pickup coils are manually adjusted about their horizontal axes to align them with the chosen magnetic dip.

Mechanism for rotating pickup coils 100 about their orientation axes includes back gearing such that as the model aircraft rotates in one direction in respect to substage 76, the pickup coils are rotated in the opposite direction through an equal angle. Thus the coils are at all times maintained with their longitudinal axes parallel to each other and to the direction chosen as that of the earth's magnetic field.

The remainder of the simulated detection equipment is remotely mounted and is connected to the model aircraft through suitable cabling arrangements. There are provided circuits whereby the modulated alternating-current output of pickup coils 100 produced by relative motion of model aircraft 60 serve to provide approximate indications of recording meters similar to those used in the actual detection equipment. These circuits are identical for the two detection equipments and the following description applies to either.

Figure 3:
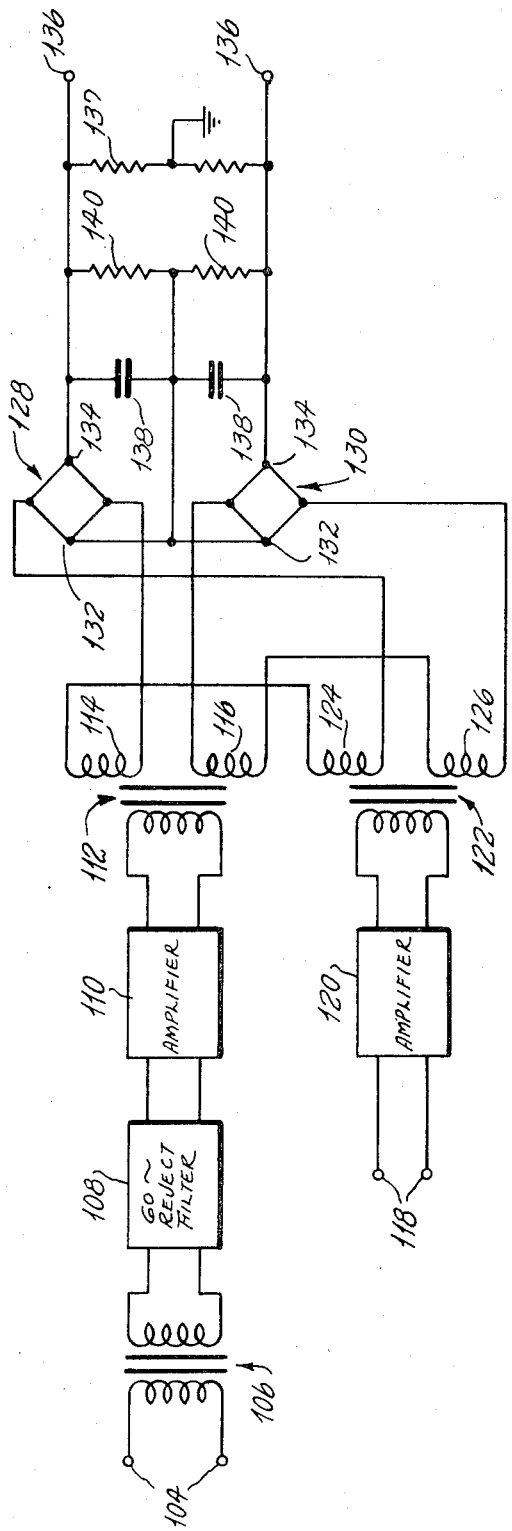
FIG. 3 is a circuit diagram of a simulated detection device for use with the model aircraft.

Referring to FIG. 3, there is shown a circuit diagram of one channel of simulated detection equipment indicated generally in FIG. 1 at 102. The output of pickup coil 100, connected across input terminals 104, is applied through transformer 106 and a filter 108, arranged to reject 60-cycle interference, to the input of amplifier 110. The output of amplifier 110 is applied to the primary winding of a transformer 112 having secondary windings 114 and 116. A reference signal is applied to input terminals 118 from the same oscillator which supplies excitation to the submarine model coils. From terminals 118, this signal is applied to the input of amplifier 120, the output of which is connected to the primary winding of a transformer 122 having secondary windings 124 and 126. Secondary windings 114 and 124 of transformers 112 and 122, respectively, are connected in series opposition across the input diagonal of bridge rectifier 128, and remaining secondary windings 116 and 126 are connected in series aiding across the input diagonal of a second bridge rectifier 130. Output terminals 132 of rectifiers 128 and 130 are connected together and output terminals 134 of bridge rectifiers 128 and 130 are connected in opposition to circuit output terminals 136 between which is connected a resistor 137 having a grounded center tap. Filter systems each comprising a capacitor 138' and a resistor 140 are connected between output terminals 132 and 134 of each rectifier bridge.

This circuit arrangement effectively provides a balanced two-sided output similar to that used in the actual detection equipment. In its operation, the modulated alernating-current signal is added to a reference signal and applied to the input terminals of one of the rectifiers and is simultaneously subtracted from the reference signal and applied to the input terminals of the other of the bridge rectifiers. The D-C output circuits of the two bridge rectifiers are connected in such manner that the two D-C components are subtracted, thereby producing an output signal across terminals 136 which varies positively or negatively in respect to a balance point in accordance with variations in the input signal.

Since the actual detection equipment herein contemplated is necessarily provided with a limited pass band for the purpose of eliminating extraneous magnetic "noise," its output signals are not strictly proportional to changes in the measured magnetic field. Such effects may, if desired, be reproduced in the training system of the invention by means of a suitable circuit having a pass band similar to that of the actual detection equipment and connected between output terminals 136 of each of the simulated detection devices.

Indicating devices, as for example milliammeters 138 (FIG. 1), are connected to the output terminals of each of the simulated detection systems to provide a visual indication when the pickup coils are brought within range of the model submarine. Such meters may conveniently be of the recording type to provide a permanent record of the signals received, thus furnishing valuable means for training in the problems of signal recognition.

Since the training system is intended to simulate actual tactical situations, it will be understood that neither the pilot of the model airplane nor the commander of the model submarine should be allowed to see the actual models under their control as they move over the tactical area. Accordingly, controls for the submarine are grouped with certain other equipment at a location designated herein as the submarine control position and indicated in FIG. 1 at 142. Similarly, the airplane controls and other equipment required for its operation are mounted at a second remote location indicated at 144. The operators of the two craft have available in actual practice, however, certain information which assists them in determining the operation of their craft. For example, the pilot of the model aircraft must be provided with information as to his location in respect to the tactical area, while the submarine operator is entitled to the same information in respect to his craft. Neither, however, should have any information as to the location of the craft under the control of the other, except as obtained by the aircraft operator through the use of the simulated detection system. An exception to the above is, of course, to be made when it is desired to simulate the type of visual contact which is possible when the model submarine is surfaced.

In order to provide the information referred to above, an indicator system is provided in each of the control positions. These indicator systems are arranged in each case to provide the operator of the model craft with which they are associated with information as to the location of his own craft in respect to the tactical area and also, under certain conditions, to provide information as the location of the other craft. Conveniently, these systems are of the general type wherein means are provided for reproducing the motions of two remotely located systems in superposition for comparison and correlation. One possible embodiment can be used in connection with two remotely located translation systems of the type adapted to cause plane motion of a body in respect to an orthogonal coordinate system by giving it component motions in each of the two orthogonal directions. Alternatively it can be used with any translation systems so constructed that data as to the motion of the translated body in orthogonal component directions is available.

Such an indication system can comprise two translation systems of the geenral type disclosed in copending application Ser. No. 547,478, series of 1935, for Translation System by Otto H. Schmitt and Earl G. Sorenson, mounted on opposite sides of and parallel to an indicating plane. Each of the translation systems comprises a beam arranged to reciprocate in one sense and a carriage arranged to move along the beam in another sense. These systems are so mounted in respect to each other and in respect to the indication plane that the movements of indicators, supported by the carriages of the two systems, can be referred to a common set of coordinates in the indication plane.

First drive motors are provided for effecting motion of the beams, and the carriages are moved by second drive motors. The motors in each case act through systems of cables and pulleys such that independent movement of any of the moving members can be produced without interaction with any other moving member.

The cable systems for moving the beams each comprise a pair of endless belts running over idler pulleys mounted on shafts, and drive pulleys mounted on the shafts of the first drive motors. The beams are in each case connected initially in the endless belt systems in such fashion that they are constrained always to remain normal to their direction of travel.

The carriages are driven through noninteracting cable systems by the second motors. While generally similar to the systems in the copending application referred to above, means to increase the travel of the carriages per revolution of their drive motors is provided. Provision is made for taking in cable at twice the rate obtained at the same motor speed with the system of that application. Thus, each of the carriage-cable systems comprises two cables. The first cables pass around carriage pulleys, beam pulleys and idler pulleys to storage drums mounted on the drive shafts of the second motors. As the shafts revolve, both ends of the cable are either taken in or paid out simultaneously.

The arrangement of the second set of cables is identical, except that these cables are terminated on their own storage drums in such fashion that when the first cables are paid out the second cables are taken in, and vice versa. The storage drums can be made adjustable independently as to angular position on the shafts of the second drive motors to thus provide means for tensioning the cables.

The system thus far described provides means for moving two indicators independently to any desired positions in respect to a coordinate system in the indication plane. If the drive motors of the two indicator translation systems are operated to cause motion of the associated indicators in respect to the coordinates in the indication plane proportional respectively to the motions of the carriages of the two remote translation systems in respect to their separate sets of coordinate axes, the motions of the two remote translation systems can be reproduced in respect to each other on opposite sides of the indication plane. Conveniently, the drive motors can be self-synchronous receivers which are driven by self-synchronous transmitters asociated with the remote translation systems, although other transmission methods can also be used.

The indication plane can be imaginary, or a sheet of plate glass marked in coordinate squares, or can be a sheet of translucent material. In the first two cases, each of the carriages can be provided with crosshair sights by means of which their positions with respect to the indication plane and to each other can be observed. In the third case, the carriage of the lower translation system can be provided with means for projecting a light beam on one side of the indication plane, this light beam being visible on both sides of the plane to show the position of the lower carriage, while the carriage of the upper system can be provided with a crosshair sight as in the first two cases.

As applied in the training system of the present invention, the details of the indicator systems vary slightly depending upon the control position at which they are to be used.

In the submarine operator's indicator system 146 (FIG. 1), the motion of model submarine 10 is reproduced on the upper side of a translucent and horizontal indicating plane. Motion of model aircraft 60 is reproduced by the second system located beneath the translucent plane and is normally invisible to the submarine operator. The indicator of the system associated with the model aircraft is provided with a small light, however, which may be used to throw a beam on the translucent indicating surface whenever the submarine is surfaced, thereby providing the submarine operator with an indication of the position of the model aircraft in respect to the position of his own craft.

Pilot's indicator system 148 is basically a duplicate of submarine operator's indicator system 146 with the exception that the motion of the model aircraft is reproduced on the upper side of the translucent indicating plane while that of the model submarine is reproduced on the lower side. In addition, the entire system is conveniently mounted on a turntable which is rotated in accordance with changes in course of the model aircraft. This is effected in one embodiment by means of a self-synchronous receiver which is driven by the heading self-synchronous transmitter in aircraft course-control mechanism 72, and which acts to rotate the indicating plane simulating the tactical area in the proper direction to simulate the apparent motion of the area beneath the aircraft as the aircraft turns.

In order to give the operator of the model aircraft all the information which he would have available in practice, means are provided whereby marker flares may be simulated, these flares being dropped in practice from the aircraft to indicate its position over the tactical area at a particular moment. The simulated flares must, of course, disappear after a given elapsed time as actually occurs in practice. Conveniently, the flares may be reproduced by means of the system disclosed in Letters Pat. No. 2,628,881 issued Feb. 17, 1963 to E. W. Adams, Jr. for Recording Method, in accordance with which temporary indications of the position of a moving index are provided by means of drops of volatile fluid which disappear after a chosen time interval. As suggested in that patent, the flare indicator drops may conveniently be formed by means of a solenoid-operated hypodermic syringe mounted on the moving index. Such a syringe is, therefore, mounted on the model aircraft indicator of pilot's indicator system 148, and a flare simulator device for actuating the syringe control means for the flare simulator is included with aircraft controls 70, whereby the operator of the model aircraft may place indicator drops on the translucent indication plane as desired.

Since tactical operations of the type herein contemplated ordinarily are terminated if successful by a bombing of the target craft (in this case the model submarine), means are provided whereby a bomb attack may be simulated. One system for this purpose is disclosed in Letters Pat. No. 2,719,366 issued Oct. 4, 1955 for Bomb Simulator to Otto H. Schmitt and George S. Dzwons and provides means whereby bombs are simulated by high-tension sparks which, under the proper conditions, will leap from an array on a model attacking craft to a target on a model target craft. In the training system of the present invention, a bomb array 150 having spaced points is associated with model aircraft 60 and a target 152 having target wires 154 and 156 is associated with the model submarine. For convenience in mounting, these elements are shown in FIG. 1 as being supported by means of auxiliary turntables separate from those supporting model aircraft 60 and model submarine 10. Thus bomb array 150 is mounted on turntable shaft 158, parallel to and spaced from shaft 78 of the turntable supporting airplane model 60, and rotatable therewith in such fashion that the line of the bomb array points is at all times normal to the heading of the model aircraft. The bomb array is supported at a fixed distance below carriage 64 and its vertical position is not altered in any way by the elevator mechanism on which the model aircraft is mounted.

Similarly, target 152 is supported by shaft 160 of a turntable mounted on submarine carriage 14. This shaft is parallel to shaft 24 of model submarine turntable 24, and is positioned in the same relation to the submarine turntable as shaft 158 supporting bomb array 150 is positioned in respect to shaft 78 of the aircraft turntable. The length of shaft 160 is such that when the model aircraft and the model submarine are in superposition, bomb array 150 is directly above target 156 and is separated therefrom by approximately one-eighth inch.

As taught in the patent last mentioned above, target wire 154 represents to scale the areas of model submarine 10 in which direct hits may be scored, while target wire 156 represents the areas in which near hits may be obtained, target wire 154 being raised slightly above target wire 156. Thus if any of the points of bomb array 150 are over target wire 154 when the bomb simulator mechanism is actuated, sparks will leap to target wire 154 in preference to target wire 156.

Means for generating the high-tension pulses required for the bomb simulator are located at pilot's control position 144, and are indicated at 162. As shown in FIG. 1, these means are under the control of the model aircraft operator through the use of control means included in aircraft controls 70. Indicating means 164, by means of which the results of a simulated bombing are recorded, are mounted in pilot's control position 144.

As indicated in FIG. 1, a connection is provided between bomb simulator 162 and flare simulator 149, and these units are arranged in such fashion that a flare indication is made whenever the bomb release mechanism is actuated. It will be noted, however, that the flare simulator may be actuated without necessarily actuating the bomb simulator.

To facilitate the use of the training system, controls 166 duplicating both aircraft controls 70 and submarine controls 20 are reproduced at a third control position indicated at 168, which is provided for an engineer or instructor. Here also is provided a third indicator system 170 similar to those provided at the pilot's and submarine operator's stations by means of which movements of both model submarine 10 and model aircraft 60 are reproduced. This indicator system is similar to pilot's indicator system 148 and submarine operator's indicator system 146 with the exception that means are provided whereby a permanent record of the movements of the two model craft may be made.

Such a record may, for example, be made in accordance with the disclosure of copending application Ser. No. 550,323, filed Aug. 19, 1944, now abandonded, Recording Method, Edgar W. Adams, Jr. In that application there is shown a method for recording simultaneously two curves indicating the operation of separate remotely located systems which includes providing a substantially rigid recording sheet of translucid material, as for example stretched tracing paper, and drawing the curves simultaneously on opposite sides thereof. Accordingly, the indicator plane of engineer's indicator system 170 comprises a stretched sheet of tracing paper, and ink writers are mounted on the two indicators associated respectively with the airplane and submarine models. These ink writers are provided with inks of different colors so that the two curves may be readily distinguished.

In the operation of the training system, excitation to coils 32, 34 and 36 of submarine model 10 is adjusted to reproduce a particular submarine under chosen conditions. Pickup coils 100, mounted on model aircraft 60, are oriented about their horizontal axes to simulate operation at the chosen dip angle. These operations are preferably performed by the engineer using engineer's controls 166 in the case of the submarine field adjustment. Control is then turned over to the operator trainees and a visual contact is simulated by surfacing model submarine 10 momentarily. Thereafter the submarine model is submerged and the model aircraft operator is allowed to search for it using any desired tactical procedure. Flares are dropped as desired using flare simulator 149, and the search is continued using the indications of recording meters 138 until the location of the model submarine is established. The submarine operator may use any evasive tactics desired to prevent detection.

When the pilot of the model aircraft believes he has accurately located the model submarine, he "flies" the model aircraft over the suspected position of the model submarine and actuates bomb simulator 162. The results of the attack are indicated on bomb hit indicator 164.

A permanent record of the courses of two craft is provided by means of engineer's indicator system 170, the translucid sheet of which may be removed for study and filed for future reference.

What is claimed is:

1. In a system for training military personnel in the tactical use of target detection equipment, a device simulating a miniaturized seacraft to be hunted and comprising a plurality of coils and means generating relatively discrete magnetic fields in said coils, first apparatus for mounting said device and operable to cause said device to travel about in a plane area of limited size, means simulating a miniaturized attacking aircraft and comprising pickup coils influenced by said magnetic fields, second apparatus for mounting said means adjacent said first apparatus and operable to cause said means to travel about in a zone substantially parallel to said plane area, two sets of independently operable control mechanisms for selectively operating said first and second apparatus, and electrical means associated with said pickup coils to indicate the position of said pickup coils within said zone.

2. In the system of claim 1, a pair of operators' stations from which the defined pieces of apparatus are directly invisible, and an electrical control unit at each station for actuating said control mechanisms.

3. In the system of claim 1, mechanism for simulating a destructive attack when said aircraft and said seacraft closely approach each other and comprising: complemental members mounted respectively upon the first and second named apparatus and capable of sparking when they are in proximity, manually operable means for energizing said members to cause spark production, and means for indicating any successful energization to the observer.

4. In a system for training military personnel in the use of target detection equipment, a plurality of rather closely grouped but separated units comprising at least two operators' stations and a simulating unit; said simulating unit comprising a simulated seacraft, a simulated aircraft, and two substantially parallel pieces of apparatus, portions of which carry said seacraft and aircraft respectively and which are relatively movable within a zone of limited size; said seacraft embodying magnetic means for producing a complex field within said zone, and said aircraft embodying pickup means responsive to said field; mechanism connected from said operators' stations to said pieces of apparatus to selectively move them and thus vary the positions of and the distance between said aircraft and said seacraft; and means connected from said pickup means to at least one station to indicate the position of said seacraft.

5. In the system of claim 4, in addition to a seacraft operator's station and an aircraft operator's station, an instructor's station; comprising means for actuating one or both of said pieces of apparatus and means for registering the positions of said simulated crafts.

6. In the system of claim 4, that piece of apparatus, carrying said simulated aircraft, embodying means for moving the latter transversely through said zone as well as sidewise and endwise; and this last mentioned means being under control from both stations, whereby the distance of transverse movement may be utilized to simulate submarine depth as well as aircraft's altitude; and means at the seacraft control station for accurately indicating any surfacing of the submarine.

7. A magnetic detection equipment tactical training system comprising a scale model submarine having means to generate a magnetic field, a first translation system coupled to orient and move said submarine in a plane, a submarine course control element actuating said translation system, a submarine control station positioned remotely from said submarine and comprising a submarine control element actuating said course control element and a submarine operator's indicator system, a scale model aircraft having a plurality of pickup coils responsive to such magnetic field, a second translation system coupled to orient and move said aircraft horizontally, vertically and transversely, an aircraft control station positioned remotely from said aircraft and from said submarine control station and comprising an aircraft control element actuating said second translation system, a pilot's indicator system, and detection equipment actuated by said pickup coils, an instructor control station positioned remotely from said above-mentioned stations and comprising means to actuate said submarine control element, said aircraft control element, and said means to generate a magnetic field selectively, and further comprising an instructor's indicator system, and means coupling said three indicator systems to said first and second translation systems.

References Cited

UNITED STATES PATENTS

| | | | |
|---|---|---|---|
| 2,321,799 | 6/1943 | Cone | 35—12 |
| 2,358,793 | 9/1944 | Crane | 35—12 |
| 2,366,603 | 1/1945 | Dehmel | 35—12 |
| 2,254,159 | 8/1941 | Sperti | 35—1 |
| 2,326,764 | 8/1943 | Crane | 35—12 |
| 2,379,447 | 7/1945 | Lindsey | 177—385 |
| 2,415,808 | 2/1947 | Buckley | 177—387 |
| 1,968,068 | 7/1934 | Blancard | 35—10.2 |
| 2,312,962 | 3/1943 | De Florez | 35—10.1 |
| 2,438,898 | 4/1948 | Campbell | 35—10.1 |
| 2,442,788 | 6/1948 | Trepton | 35—10.1 |
| 2,396,857 | 3/1946 | Kittredge | 35—25 |

FOREIGN PATENTS

| | | | |
|---|---|---|---|
| 146,962 | 2/1921 | Great Britain | 177—385 |

WILLIAM H. GRIEB, Primary Examiner

U.S. Cl. X.R.

35—10.4